United States Patent [19]
Ferlin et al.

[11] Patent Number: 5,833,280
[45] Date of Patent: Nov. 10, 1998

[54] MECHANICAL JOINT

[75] Inventors: William J. Ferlin, Franklin; Bryan Keith Cofer, Oak Ridge; Anthony Wade Simpson, Jacksboro; Garry Wayne Woods, Heiskell, all of Tenn.

[73] Assignee: Lincoln Brass Works, Inc., Nashville, Tenn.

[21] Appl. No.: 606,581

[22] Filed: Feb. 26, 1996

[51] Int. Cl.⁶ .................................................. F16L 25/00
[52] U.S. Cl. ...................... 285/330; 285/332; 285/382.1; 285/422
[58] Field of Search .............................. 285/382.4, 382.5, 285/422, 330, 382, 332

[56] References Cited

U.S. PATENT DOCUMENTS

| | | |
|---|---|---|
| 1,776,615 | 9/1930 | Boothman et al. . |
| 1,858,136 | 5/1932 | Brenner ............................ 285/382.5 X |
| 2,165,621 | 7/1939 | Donahue et al. ................ 285/382.4 X |
| 2,434,080 | 1/1948 | Rosa ................................. 285/382.5 X |
| 2,438,530 | 3/1948 | Woodling . |
| 2,543,087 | 2/1951 | Woodling . |
| 3,188,733 | 6/1965 | Rickard ............................. 285/382.4 X |
| 3,787,945 | 1/1974 | Pasek et al. . |
| 4,103,937 | 8/1978 | Wakefield ............................ 285/382 X |
| 4,126,929 | 11/1978 | Ridenour . |
| 4,200,314 | 4/1980 | Ridenour . |
| 4,330,144 | 5/1982 | Ridenour . |
| 4,357,990 | 11/1982 | Melnyk ................................ 285/382 X |
| 4,469,356 | 9/1984 | Duret et al. ....................... 285/382.5 X |
| 4,575,134 | 3/1986 | Sugano . |
| 4,776,616 | 10/1988 | Umehara et al. . |
| 5,078,433 | 1/1992 | Morse et al. . |

FOREIGN PATENT DOCUMENTS

| | | | |
|---|---|---|---|
| 276483 | 8/1988 | European Pat. Off. ............... | 285/382 |
| 4201799 | 7/1993 | Germany .............................. | 285/382 |
| 410268 | 4/1947 | Italy ....................................... | 285/382 |
| 547358 | 8/1942 | United Kingdom ................ | 285/382.5 |
| 688579 | 3/1953 | United Kingdom . | |

*Primary Examiner*—Dave W. Arola
*Attorney, Agent, or Firm*—Harness, Dickey & Pierce, P.L.C.

[57] ABSTRACT

A mechanical joint tube assembly and method of creating the same is disclosed for providing an improved fluid fitting assembly. A fitting having a primary tapered bore is forced onto a tube that has a larger diameter. The tube is radially contracted in certain portions and is radially expanded in other portions of the fitting in order to create a plurality of compression seals. A collar of the fitting is crimped around the bead that is formed in the tube in order to provide an additional compression seal and means for retaining the tube within the fitting. Alternative forms of the primary bore in the fitting includes a hexagonal shaped configuration, a splined shaped configuration and a slotted collar configuration for enhancing retention of the tube within the fitting. A unique method of manufacturing is used to make these tube fitting assemblies.

14 Claims, 4 Drawing Sheets

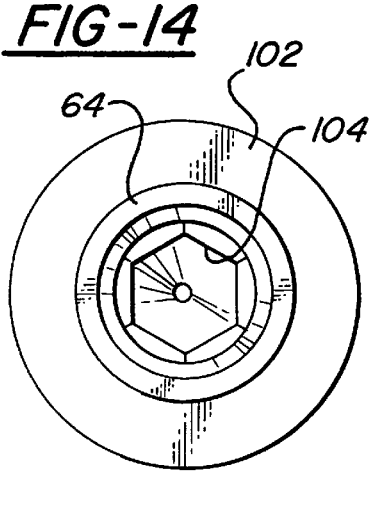
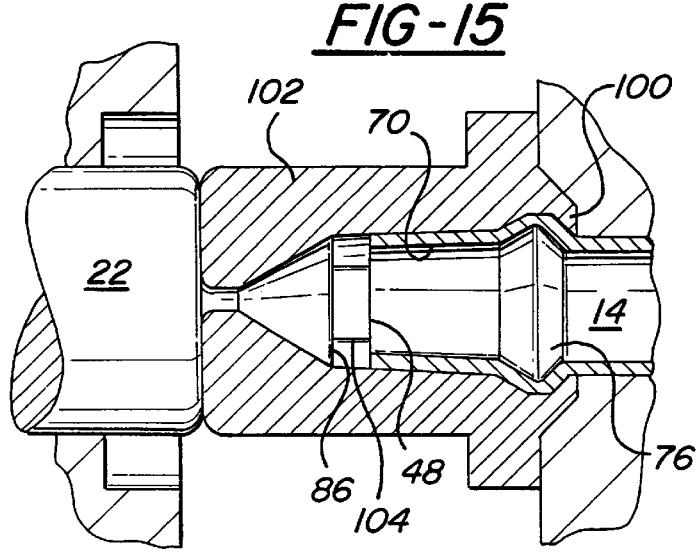
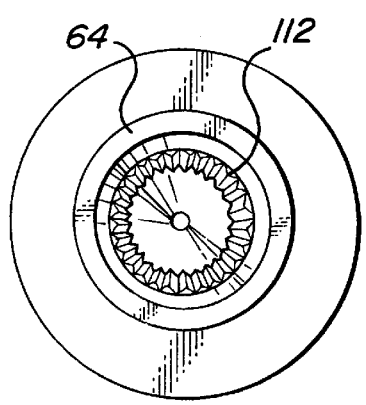
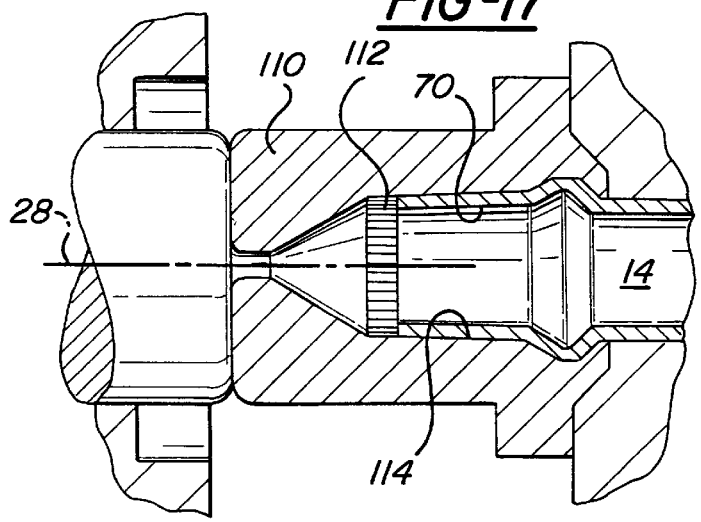
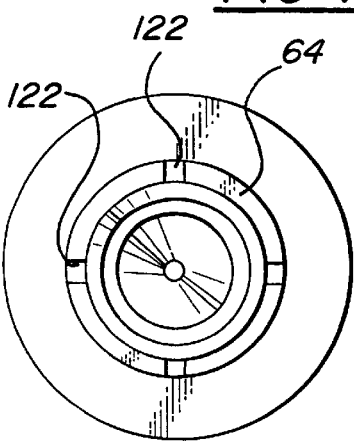
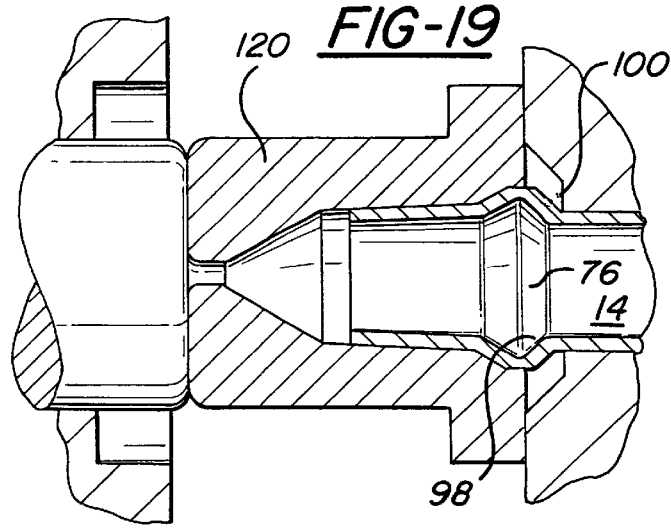

MECHANICAL JOINT

FIELD OF THE INVENTION

The present invention relates generally to a tube fitting assembly and a method for joining a tube to a fluid fitting for creating a fluid tight tube fitting assembly.

BACKGROUND AND SUMMARY OF THE INVENTION

It is well understood in the metal working art to provide a tube and fitting assembly wherein a seal is created through the deformation of material. The deformation process causes a cold welding of the tube to the fitting due to extremely high pressures exerted between the tube and fitting. Cold welding is generally accomplished on softer materials such as aluminum, brass and the like, when the materials to be joined are freshly cut or prepared. However, if the parts to be joined are precut and stored for too long of a period of time, it is possible that corrosion or oxidation could develop on the precut surfaces. If this occurs, the cold weld may not properly form on the oxidized surfaces. Accordingly, the integrity of the joint could be sacrificed.

It is also known in the mechanical joint art to join a tube and fitting by inserting a tube into the fitting and using a flaring tool to expand the wall of the tubing in order to engage the fitting. Such process, however, is generally only suitable for larger tubes, may not result in a high pressure seal, and may require a separate flaring tool.

Also known in the mechanical joint art is the method of using a ring stake to join a small tube to a fitting. The ring stake process incorporates a fitting having a single bore having a diameter the same as the outside diameter of the tube. The tube is inserted into the bore and a fixture swags an outside surface of the fitting to cause a deformation of the fitting in order to engage a wall of the tube. This process does not require an internal flaring tool yet provides a seal at low-pressures when torsion is not present between the tube and the fitting. However, this seal could be destroyed if torque is applied between the tube and fitting thus, the ring stake method of joining a tube and a fitting is unreliable in certain applications.

Also, it is known in the mechanical joint art to provide a helically threaded bore in a fitting for securing at least a part of the tube within the fitting. In such a situation, the tubing is expanded radially within the internal diameter of the bore and molded into the threads. Such designs are not acceptable for applications where torsional stresses are to be introduced to the fitting and tube and thus integrity of the joint could be sacrificed in many applications.

The above-referenced methods and apparatuses are effective sometimes for malleable materials such as aluminum and brass for low pressure applications. However, such designs can be disadvantageous for several reasons. First, they may not be reliable when the assembly is stress relieved due to exposure to extreme thermal changes. Second, such methods and apparatuses are not practical for harder metals due to the pressure required to upset the material and the characteristics of harder metals to resist such displacement. Third, such apparatuses and methods have low torsional strength because of the nature of the ductile materials best adapted to these methods. And fourth, such apparatuses and methods may not perform well under certain environmental conditions, for example, near the ocean where it can be a salty environment.

Therefore, there is a need to provide an apparatus and an improved method of making a tube fitting assembly that does not depend solely upon cold welding, requires no internal flaring tools, can be formed in a minimal number of steps, can be mass produced, results in a high torsional strength joint, and is capable of high pressure sealing. Also, there is a need to provide a tube fitting assembly that is reliable when subjected to vibration, extreme thermal environments and corrosive environments, yet is capable of providing a plurality of radial surface areas of stress that perform as mechanical seals. Further, there is a need to provide a mechanical joint tube assembly that can be formed from a wide selection of tubing diameter and wall thicknesses, as well as being capable of being formed from the same materials such as brass, aluminum and/or steel including various types of stainless steel. Tube assemblies made of stainless steel would have numerous applications in ocean environments. It would be very advantageous to provide a tube fitting assembly wherein the tube and the fitting are made from a wide selection of material properties, including, for example, a tube made of aluminum which is very malleable and a fitting made of brass.

Accordingly, it is an object of the present invention to provide a mechanical joint tube fitting assembly and method of creating the same that overcomes the problems mentioned above. Such a tube fitting assembly should be simple in design, minimize the number of operations required by an operator to create such an assembly, and minimize the number of tools that are required to perform such an operation while still being capable of providing a mechanical joint with significant joint integrity.

A first preferred form of the present invention provides as one of its aspects, a method of creating a mechanical joint comprising the step of axially compressing a fitting onto a tube to create a first compression seal by radially contracting a portion of said tube within a tapered bore section of the fitting.

A second aspect of the present invention resides in a unique method of creating a mechanical joint comprising the steps of locating a tube relative to a tube stop, inserting a fitting within the tube stop, clamping a tube, passing a ram through one end of the tube stop and forcing the fitting onto the tube a predetermined distance to thereby create at least one seal.

A third aspect form of the present invention resides in the provision of a tubing joint for a fluid device comprising a metal tubing having an outside diameter with a configuration that is essentially cylindrical, a radially expanded beaded portion, a radially contracted portion and an inner fluid passageway extending therethrough. The tubing joint is further comprised of a metal fitting having a primary elongated bore that is tapered and has an effective diameter that is less than the outer diameter of the metal tubing. The metal fitting further has an aperture surrounded by a collar that is operable to be crimped and thus secure the radially expanded beaded portion. Such a tubing joint provides a plurality of compression seals, which results in a joint having significant joint integrity. Alternative forms of the present invention include providing a fitting with a primary tapered bore having a hexagonal configuration, or a splined configuration or slotted collar configuration. Such a device includes a mechanical joint having an anti-rotational means and an axial retention means for enhancing the integrity of the joint.

For a more complete understanding of the mechanical joint of the present invention, reference is made to the following detailed description and accompanying drawings in which the presently preferred embodiments of the invention are illustrated by way of example. As the invention may be embofixtured in several forms without departing from the spirit or essential characteristics thereof, it is expressly understood that the drawings are for purposes of illustration and description only, and are not intended as a definition of the limits of the invention. Throughout the following description and drawings, identical reference numbers refer to the same component throughout the several views.

BRIEF DESCRIPTION OF THE DRAWINGS

FIG. 6 represents the first step where the tube stop is located at a first position;

FIG. 7 illustrates the second step where the tube stop is positioned to a second position and a piece of tube stock is positioned in the fixture;

FIG. 8 illustrates the third step where the fitting is loaded within the tube stop and the tube is pushed against the tube stop;

FIG. 9 illustrates the fourth step where the tube clamps close in order to secure the tube in place;

FIG. 10 illustrates the fifth step where the tube stop is moved back to its first position where the centerlines of the ram, the fitting and the tube are aligned. FIG. 2 illustrates this alignment of the centerlines and also shows the ram beginning to enter the tube stop during the ramming step;

FIG. 11 illustrates the sixth step where the ram drives the fitting onto the tube to create the mechanical joint that is illustrated in FIG. 5;

FIG. 12 illustrates the seventh step where the ram is retracted and the tubing clamps are opened up;

FIG. 13 illustrates the eighth step where the newly formed tube assembly is removed from the fixture;

FIG. 14 is an enlarged end elevational view looking also along the lines of 4—4 of FIG. 1, but of a first alternative embodiment illustrating a fitting having a hexagonally shaped internal configuration that is used in place of the fitting depicted in FIG. 1;

FIG. 15 is an enlarged vertical sectional view of the first alternative embodiment, illustrating the tubing being joined to the fitting;

FIG. 16 is an enlarged end elevational view also look along lines 4—4 of FIG. 1, but of a second alternative embodiment illustrating a fitting having a spline shaped internal configuration that is used in place of the fitting depicted in FIG. 1;

FIG. 17 is an enlarged vertical sectional view of the second alternative embodiment, illustrating the tubing being joined to the fitting;

FIG. 18 is an enlarged end elevational view also long along lines 4—4 of FIG. 1, but of a third alternative embodiment illustrating a fitting having a slotted collar that is used in place of the fitting depicted in FIG. 1; and FIG. 19 is an enlarged vertical sectional view of the third alternative embodiment, illustrating the tubing being joined to the fitting.

DETAILED DESCRIPTION OF THE PREFERRED EMBODIMENTS

Figure 1:
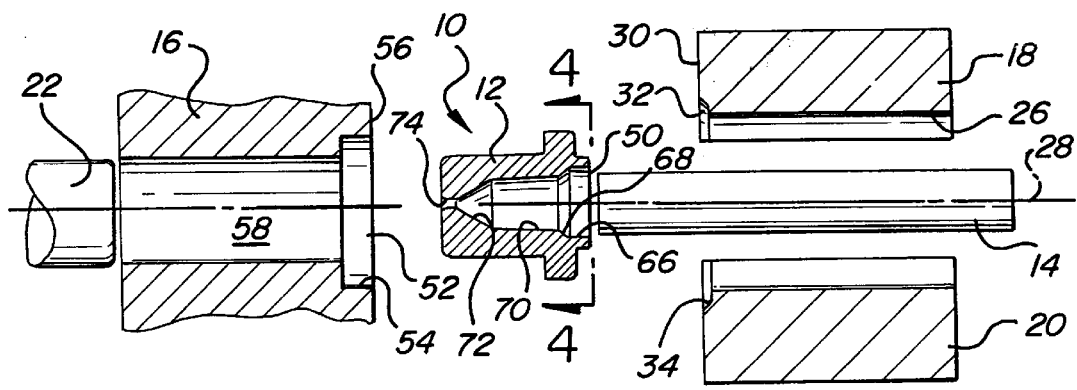
FIG. 1 is an exploded planar sectional view of the tube fitting assembly illustrating various components of the present invention including the ram, tube stop, fitting, tubing and clamps.

A system for manufacturing a tube fitting assembly 10 is shown in FIGS. 1–5. The tube fitting assembly 10 is comprised of metal fitting 12 and a cylindrical tube 14 that are joined by mechanical forces. FIG. 1 specifically illustrates these components in exploded relationship before they have been joined together. The planar view of FIG. 1 further illustrates a partial section of a tube stop 16, a first tubing clamp 18, a second tubing clamp 20, and a ram 22 that form a part of a fixture 24 (see FIG. 6).

The first tubing clamp 18 is metal block with a split bore 26 that is linear along the inner surface nearest, and parallel to the axis 28. The radius of bore 26 is slightly less than the outside radius of the tube 14, and is perpendicular to a surface 30. A depression 32 forms a part of the leading edge of surface 30 and has half the profile of a frustrum with a surface angle preferably approximately 45° relative to the axis 28. The larger radius 34 of the depression 32 is equal to or slightly greater than the outside radius 36 of a collar. The depression 32 is concentric with axis 28. The second tubing clamp 20 is a mirror duplicate of the first tubing clamp 18. Both clamps are connected to the fixture 24 and may be mechanically operated by air, hydraulics or by solenoids and can be controlled manually or by automation.

Figure 6:
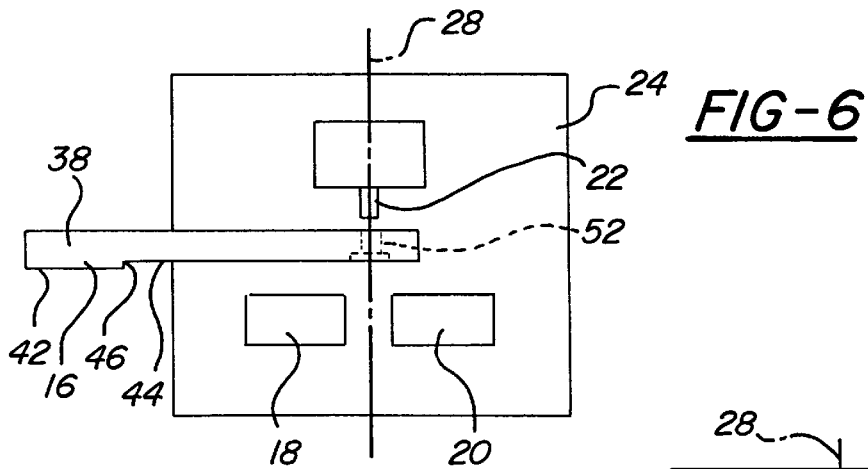
FIGS. 6–13 are planar views of the eight steps of making the present invention, specifically.
Figure 7:
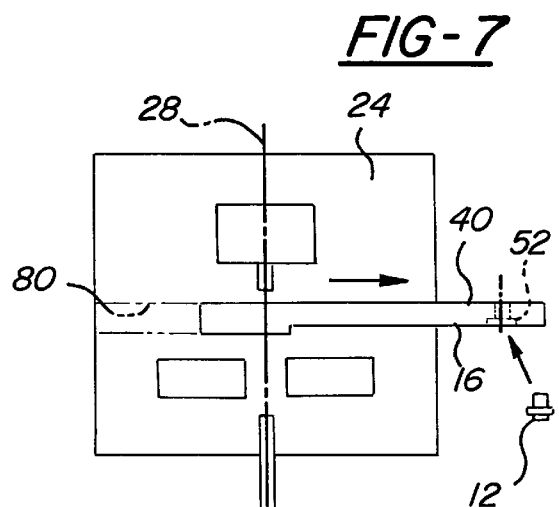

The tube stop 16 is a metal block that is slideably connected by conventional means to the fixture 24 and is operable to traverse back and forth between a first position 38 and a second position 40 as illustrated in FIGS. 6 and 7. The tube stop 16 has a tube end locator surface 42 and another surface 44 together that define a step 46. This step 46 gives the stop a flag shape in the plan view. Its purpose is to define a gap between the end 48 of the tube 14 and the trailing edge 50 of the fitting 12. This gap at least partially determines the depth of penetration of the tube 14 within the fitting 12 because the tube does not bottom out in the fitting.

The tube stop 16 further has a fitting pocket 52 located at one end for receiving fitting 12. The fitting pocket 52 has an internal profile comprising of two concentric cavities. The ram 22, preferably made of steel, has a diameter less than the diameter of either said cavities. The first cavity 54 is a cylindrical bore that originates from surface 56 and is coaxial with axis 28. The second cavity 58 is cylindrical and originates from the first cavity 54. The second cavity is coaxial with axis 28 and extends through the tube stop 16. The first cavity 54 and the second cavity 58 define a receptacle for fitting 12. It is preferred that both the tube stop and the tubing clamps be made of tool steel.

The fitting 12 has a hat-shaped external profile comprised of a cylindrical body 60, a shoulder or flange 62 and a collar 64. It will be appreciated that profiles other than the hat-shape may be used.

Figure 2:
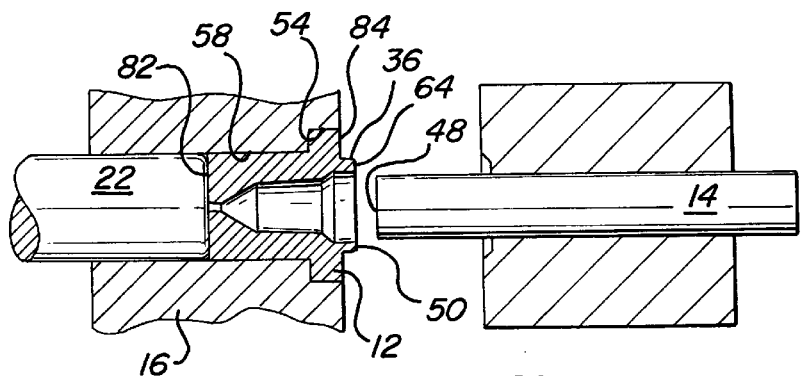
FIG. 2 is an enlarged planar sectional view of the tube fitting assembly illustrating the manufacturing step where the fitting is already inserted within the fitting pocket of the tube stop, the clamps have secured the tube in place and the ram has entered the tube stop.
Figure 3:
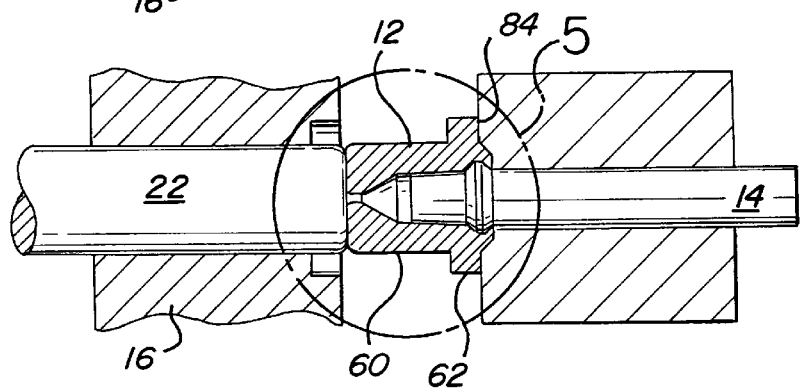
FIG. 3 is an enlarged planar sectional view of the tube fitting assembly illustrating the step where the mechanical joint has been completed.
Figure 4:
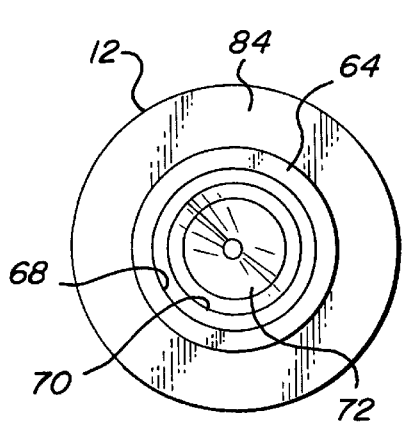
FIG. 4 is an enlarged end elevational view looking along lines 4—4 of FIG. 1, illustrating the various concentric bores of the fitting.

Referring now to FIGS. 1, 2 and 4, the internal profile of the fitting 12, before a tube 14 has been joined, is illustrated. The internal profile of fitting 12 includes an aperture defined as a cylindrical bore 66 that originates from surface 50. A second cylindrical bore 68 has a profile of a frustrum with a surface angle of approximately 45° relative to the axis 28 and its larger diameter is equal to and concentric with cylindrical bore 66. A third bore 70 has a profile of an elongated tapered frustrum with a surface angle preferably of about 2°–3° relative to axis 28 and its larger diameter is equal to and concentric with the lesser diameter of bore 68. A fourth bore 72 has a profile of a frustrum with a surface angle of approximately 30° relative to axis 28 and its larger diameter is equal to and concentric with the lesser diameter of the third bore 70. A fifth bore 74 has a profile of a cylinder and its diameter is equal to and concentric with the lesser diameter of the fourth bore 72.

Figure 5:
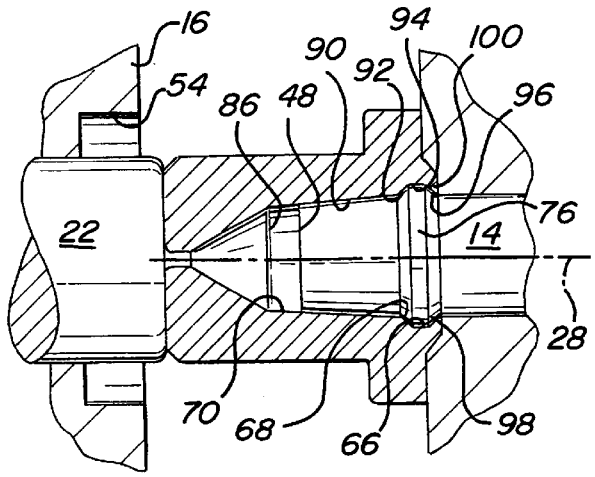
FIG. 5 is an enlarged view of the present invention illustrating in greater detail the mechanical joint.

The third bore 70 is a tapered bore having an effective diameter that is less than the outside diameter of tubing 14. Such arrangement allows for uniform circumferential compression of the tubing 14 as the fitting 12 is axially forced onto the tubing 14. FIG. 5 represents the completed joint where a means for preventing longitudinal separation of the tubing 14 and fitting 12 is illustrated and accomplished by a bead 76 being encapsulated within the crimped collar 100 during one of the last stages of operation.

The ram 22 is preferably an elongated cylindrical member that is connected to a conventional mechanical device that provides ample ramming force for creating a mechanical joint. The mechanical device may be secured to the fixture 24.

The method of forming the tube fitting assembly 10 will now be presented. FIGS. 6–13 illustrate the individual steps. The arrows illustrate the direction of the moving components. FIG. 6 is a simplified plan view of the first step of operation where the tube stop 16 is shown in its first position 38. Here, the ram 22 is in its retracted position and the clamps 18 and 20 are also in their open position.

Figure 8:
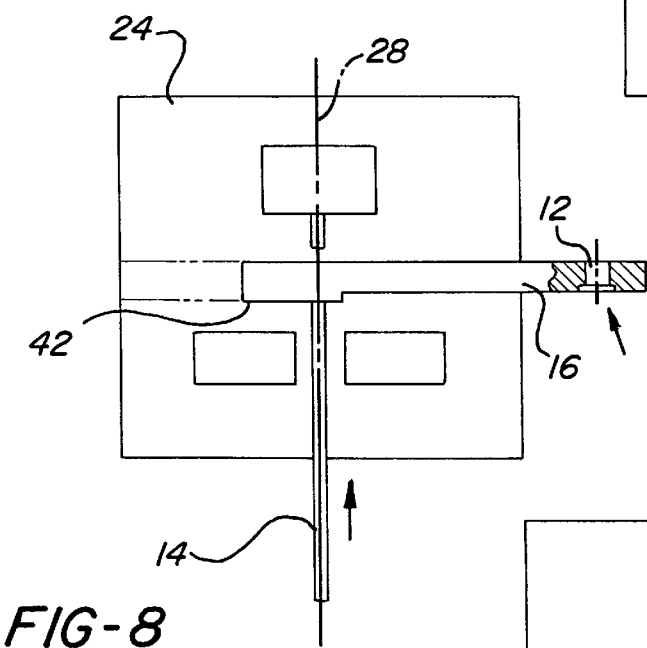

FIG. 7 illustrates the second step of the method of making the mechanical joint that is embofixtured in the tube fitting assembly 10. Here, the tube stop 16 is shown in its second position 40. This is accomplished by the tube stop 16 sliding within a guide 80 (shown in phantom) that is a part of the fixture 24. The tube stop 16 may be manually slid back and forth within this guide 80 or could be connected to conventional machinery that would automate such a task. During the second step, the tube 14 is introduced into the fixture 24. A fitting 12 is shown ready for insertion within the tube stop 16. FIG. 8 represents the third step where the tube 14 is pushed against the tube locator surface 42, which is important for locating the tube 14 relative to the fitting 12. The fitting 12 is now inserted within the fitting pocket 52 as illustrated. It will be appreciated that this task can be accomplished either manually or automatically by using a bowl-type feeder system, or a system similar thereto.

Figure 9:
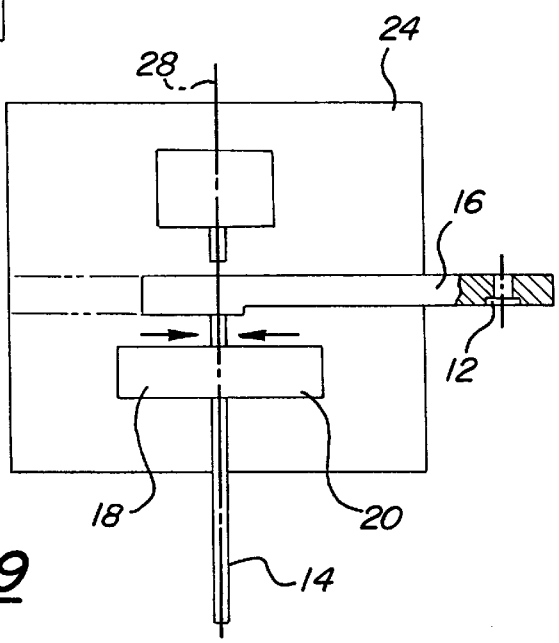

The fourth step, as illustrated in FIG. 9, requires the clamps 18 and 19 to come together and secure the tube 14. A sufficient clamping force must be maintained in order to immobilize the tube 14 during the ramming step. Failure to do so could alter the depth of penetration of the tube 14 within the fitting 12. Thus, the clamps 18 and 19, once locked into their closed position, must be firmly held in place.

Figure 10:
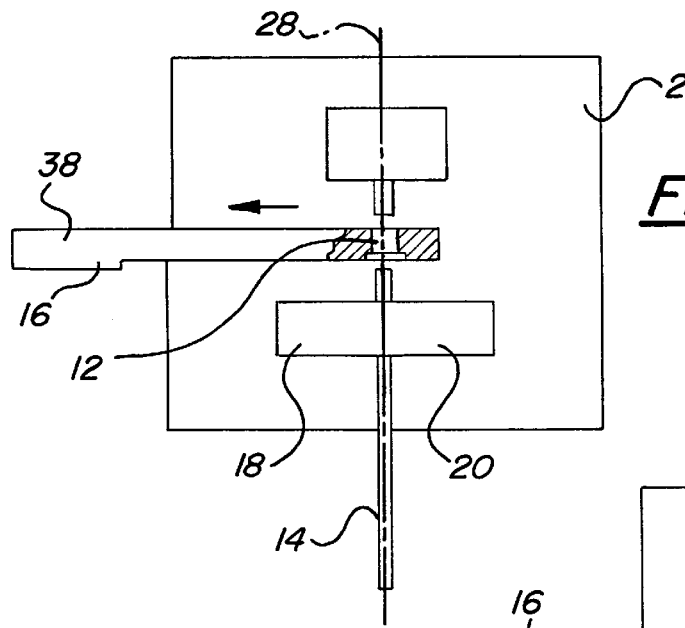
Figure 11:
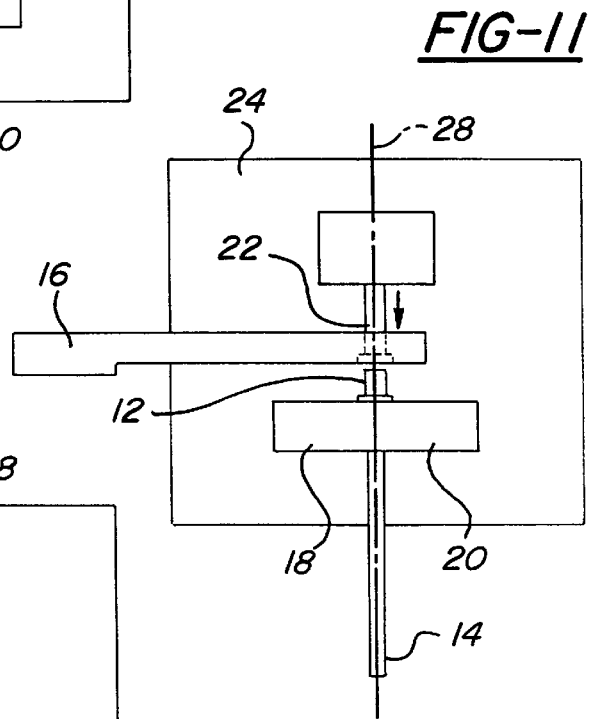

The fifth step of operation is illustrated in FIG. 10 where the tube stop 16 is slid to its first position 38. The ram 22 is still in its retracted position. At this point, the axis 28 of the ram 22, fitting 12 and the tube 14 are each aligned with one another. FIG. 11 illustrates the sixth step where the ram 22 is energized causing it to enter into the tube stop 16 and plunge into the leading edge 82 of the fitting 12. As the ram 22 progresses, the fitting 12 and the tube 14 come together and first make contact at the frustrum-shaped second bore 68 and the tube end 48 (see FIGS. 2 and 3). The perimeter of the tube 14 now begins to contract and become compressed and continues to do so as it enters the tapered bore of 70. When the edge 50 of the collar 64 meets the depression 32, the collar 64 begins to deform. The face or shoulder 84 of the fitting 12 then engages face 30 of the clamps. This connection defines a stop for completing the travel of the fitting 12 onto the tube 14. By forcing the fitting 12 onto the tube 14, a bead 76 of material has flowed and filled the first bore of 66 and the second bore of 68. The tube end 48 is located a distance from the bottom 86 of the tapered third bore 70. The fitting 12 is completely forced out of the tube stop 16 at the completion of this step.

Referring to FIG. 5, the resulting tube assembly 10 is comprised of a plurality of compression seals that are created by the radial stresses exerted upon the tube 14. A first seal 90 is defined by tube 14 and the tapered third bore 70. A second seal 92 is defined between the tube 14 and the frustrum-shaped second bore 68. A third seal 94 is defined by the tube material that has flowed radially outwardly to define a portion of the bead 76 in the area of the first bore 66. A fourth seal 96 is defined by the trailing edge portion 98 of the bead 76 and the crimped portion 100 of the collar 64.

Figure 12:
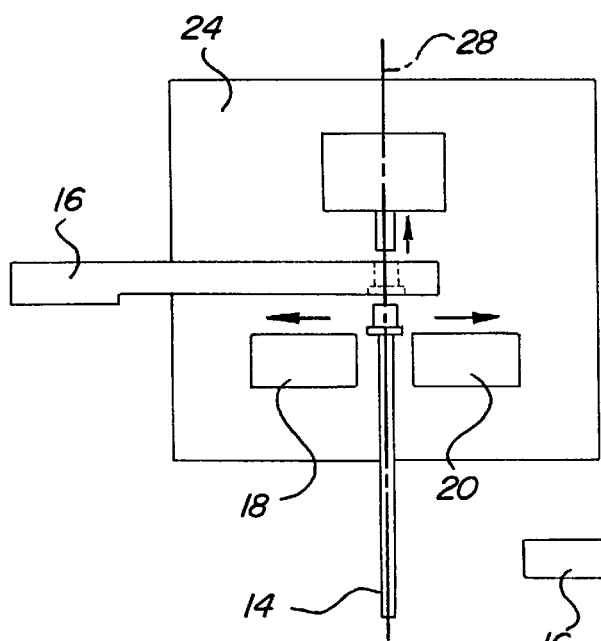
Figure 13:
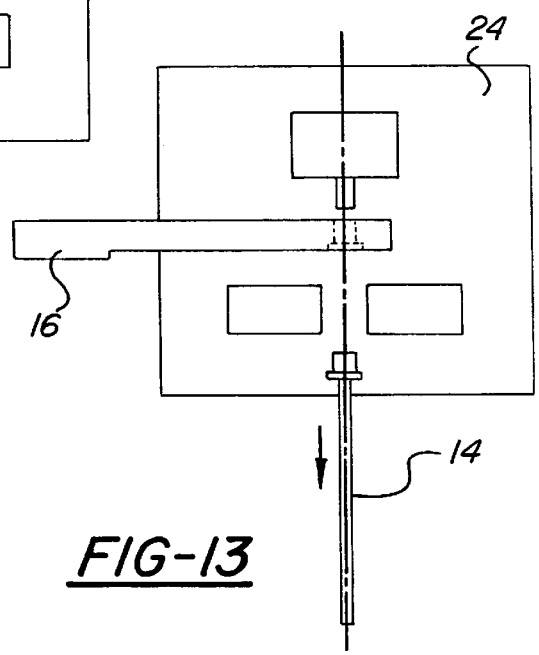

The seventh step is illustrated in FIG. 12 wherein the ram 22 is retracted, and the clamps 18 and 20 are opened up. The operator may then remove the completed tube assembly 10 from the fixture 24 as illustrated in the last step (FIG. 13). This completes one cycle of making the tube-fitting assembly 10 as illustrated in FIG. 5. It will be appreciated that certain aspects of this manufacturing process can be automated in order to suit production volume needs and to enhance product quality.

Alternative forms of the FIG. 5 preferred embodiment will now be discussed. Where applicable, like reference numbers will be used. A first alternative embodiment is illustrated in the FIGS. 14 and 15 wherein a unique fitting 102 having a hexagonal internal bore configuration or profile 104 is illustrated. The hexagonal profile 104 is located within the third bore 70. The remaining aspects of this first alternative embodiment are similar to that previously discussed in the FIG. 5 embodiment. This design provides an anti-rotation means that resists torsional forces that are exerted between the tubing 14 and the fitting 102. This in part is accomplished by the tube 14 taking on a configuration in the third bore 70 region similar to that hexagonal shape depicted in FIG. 14. Again, the end 48 of the tube stops short of the bottom 86 of the third bore 70. Like the FIG. 5 embodiment, this embodiment also has a plurality of compression seals, thus creating a mechanical joint having significant joint integrity coupled with an anti-rotation means and a retaining means. The retaining means is exemplified by the shoulder 100 retaining the bead of material 76, while the anti-rotation means is accomplished by the hexagonal profile the tube 14 has assumed once in the third bore 70.

A second alternative embodiment is illustrated is FIGS. 16 and 17. In this alternative arrangement, a tube fitting assembly employs fitting 110 that has a tapered spline shape in the third bore 70. The spline 112 runs nearly parallel to the axis 28 and follows the contour of the tapered orifice. An anti-rotation means is created when the fitting 110 is forced onto the tubing 14 as illustrated in FIG. 17. The contraction of the tubing material beyond its point of elasticity creates outward radial stress against the longitudinal splines 112 while simultaneously causing the tubing 14 to compress circumferentially in order to conform with the tapered profile of the third bore 70. This results in a compression seal 114 that is structurally sound. The other compression seals as discussed in the FIG. 5 embodiment further increase the joint's integrity.

A third alternative embodiment is illustrated in FIGS. 18 and 19 wherein a novel fitting 120 has a modified collar 64. This unique arrangement employs a plurality of slots or notches 122 that are spaced apart and located in the collar 64 at locations about its circumference. The notches 122 preferably only extend the depth of the collar 64. By interrupting the continuous flow of the circumference, the collar 64 is relieved which results in a better crimp 100 around the perimeter of the trailing edge 98 of the bead 76. This enhanced holding means improves the integrity of the joint created between the tube 14 and the fitting 120. The remaining aspects of the third embodiment are similar to the FIG. 5 embodiment. It will be appreciated that the slotted collar configuration could be employed with the FIG. 15 and 17 embodiments.

It will be appreciated that other internal configurations of the fittings besides the hexagonal shape, spline shape, and the slotted collar shaped configurations could be used. Moreover, different external profiles of the fittings could be used besides that illustrated herein.

The method of making the first, second, and third alternative embodiments is identical to the steps outlined in FIGS. 6–13.

What is claimed is:

1. A tube fitting assembly for a gas line comprising:
    a fitting comprised of:
    a first bore surrounded by a collar that is formed on an outer surface of said fitting,
    a second cylindrical bore located adjacent the first bore,
    a third ore that is frustrum shaped, the third bore having a major diameter that is equal to the diameter of said cylindrical bore,
    a fourth bore located adjacent the third bore, the fourth bore having an elongated tapered configuration extending a substantial portion of said fitting, the fourth bore further having an effective diameter,
    a fifth bore located adjacent one end of the fourth bore; and
    a tube having an end portion, a radially contracted portion, an outside diameter, and a radially expanded bead portion, said radially contracted portion being located within the fourth bore and said radially expanded bead portion being located substantially within the first, second and third bores.

2. The tube fitting assembly as claimed in claim 1 wherein the effective diameter of the fourth bore is less than the normal outside diameter of the tube.

3. The tube fitting assembly as claimed in claim 1 further comprising a compression seal between the radially contracted portion of the tube and the fourth bore of the fitting.

4. The tube fitting assembly as claimed in claim 1 wherein the fitting further has a cylindrical shoulder formed on said outer surface, said shoulder being larger diameter than the collar.

5. The tube fitting assembly as claimed in claim 1 wherein the tapered fourth bore has a hexagonal cross sectional configuration.

6. The tube fitting assembly as claimed in claim 1 wherein the tapered fourth bore has a splined cross sectional configuration.

7. The tube fitting assembly as claimed in claim 1 wherein the tapered fourth bore is smooth and continuous between the third and fifth bores.

8. The tube fitting assembly as claimed in claim 1 wherein the collar has circumference that is non-continuous, said collar is operable to collapse around the outer diameter of the tube.

9. The tube fitting assembly as claimed in claim 1 wherein the fitting and the tube are made of different materials.

10. A tubing joint for a fluid device comprising:
    a metal tubing having a tubing portion with an outside diameter with a configuration that is substantially cylindrical, a radially expanded beaded portion, a radially contracted portion and an inner fluid passageway extending therethrough; and
    a metal fitting having a primary elongated bore that has a spline shaped taper and has an effective diameter that is less than the outer diameter of the tubing portion of the metal tubing,
    said fitting further having a longitudinal retaining means for preventing axial separation of tube and the fitting.

11. The tubing joint for a fluid device as claimed in claim 10 further comprising a compression seal between the radially contracted portion and the metal fitting.

12. The tubing joint for a fluid device as claimed in claim 10 wherein the longitudinal retaining means includes an aperture with an integral collar.

13. The tubing joint for a fluid device as claimed in claim 12 wherein said collar is slotted.

14. A tubing joint for a fluid device comprising:
    a metal tubing having a tubing portion with an outside diameter with a configuration that is substantially cylindrical, a radially expanded beaded portion, a radially contracted portion and an inner fluid passageway extending therethrough; and
    a metal fitting having a primary elongated bore that has a hexagon shaped taper and has an effective diameter that is less than the outer diameter of the tubing portion of the metal tubing,
    said fitting further having an aperture with an integral collar for securing said radially expanded beaded portion.

* * * * *

UNITED STATES PATENT AND TRADEMARK OFFICE
CERTIFICATE OF CORRECTION

PATENT NO. : 5,833,280
DATED : November 10, 1998
INVENTOR(S) : William J. Ferlin et al.

It is certified that error appears in the above-identified patent and that said Letters Patent is hereby corrected as shown below:

<u>Column 4,</u>
Line 1, "long" should be -- looking --.

<u>Column 7,</u>
Line 35, "ore" should be -- bore --.
Lines 40 & 41, after "extending" insert -- for --.

<u>Column 8,</u>
Line 3, after "larger" insert -- in --.
Line 32, "tube" should be -- the tubing portion --.
Line 49, "shaped taper and has" should be -- cross-sectional shape and is tapered, the bore having --.

Signed and Sealed this

Sixth Day of November, 2001

Attest:

*Attesting Officer*

NICHOLAS P. GODICI
*Acting Director of the United States Patent and Trademark Office*